United States Patent [19]

Dhondt

[11] 4,249,855
[45] Feb. 10, 1981

[54] METHOD FOR INTRODUCING SOLIDS INTO A SOLIDS UPFLOW VESSEL

[75] Inventor: Roland O. Dhondt, Long Beach, Calif.

[73] Assignee: Union Oil Company of California, Brea, Calif.

[21] Appl. No.: 74,817

[22] Filed: Sep. 12, 1979

[51] Int. Cl.³ .................... B65G 25/04; C10B 31/02; C10B 47/22
[52] U.S. Cl. .................... 414/786; 48/86 A; 48/197 R; 48/210; 201/41; 202/262; 414/187; 414/198
[58] Field of Search ............... 414/173, 180, 181, 198, 414/293, 786, 187; 202/262; 201/31, 33, 41; 222/217; 141/113; 48/86 A, 210, 197 R

[56] References Cited

U.S. PATENT DOCUMENTS

| 300,385 | 6/1884 | Mathieu . |
|---|---|---|
| 2,501,153 | 3/1950 | Berg . |
| 2,640,014 | 5/1953 | Berg . |
| 2,871,170 | 1/1959 | Bewley et al. . |
| 2,875,137 | 2/1959 | Lieffers et al. . |
| 2,895,884 | 7/1959 | Switzer . |
| 4,033,467 | 7/1977 | Bewley et al. . |
| 4,037,736 | 7/1977 | Pownall et al. . |

*Primary Examiner*—Bradley Garris
*Attorney, Agent, or Firm*—Dean Sandford; Daniel R. Farrell

[57] ABSTRACT

A method for introducing particulate solids upwardly through a bottom solids inlet of a solids upflow vessel wherein after full extension of a piston to displace solids from a feed cylinder into the solids upflow vessel, the piston is partially retracted to "relax" the bed of solids in the solids upflow vessel. The bed relaxation step reduces the piston-to-solids pressure during the pumping stroke as well as substantially reducing the solids loading pressure on the device used to prevent backflow of solids from the upflow vessel during refilling of the feed cylinder.

20 Claims, 8 Drawing Figures

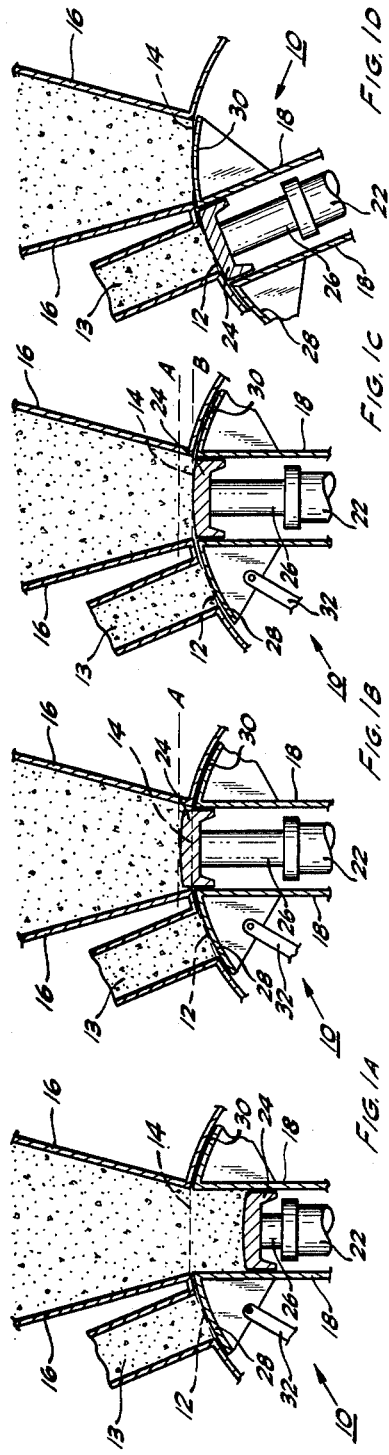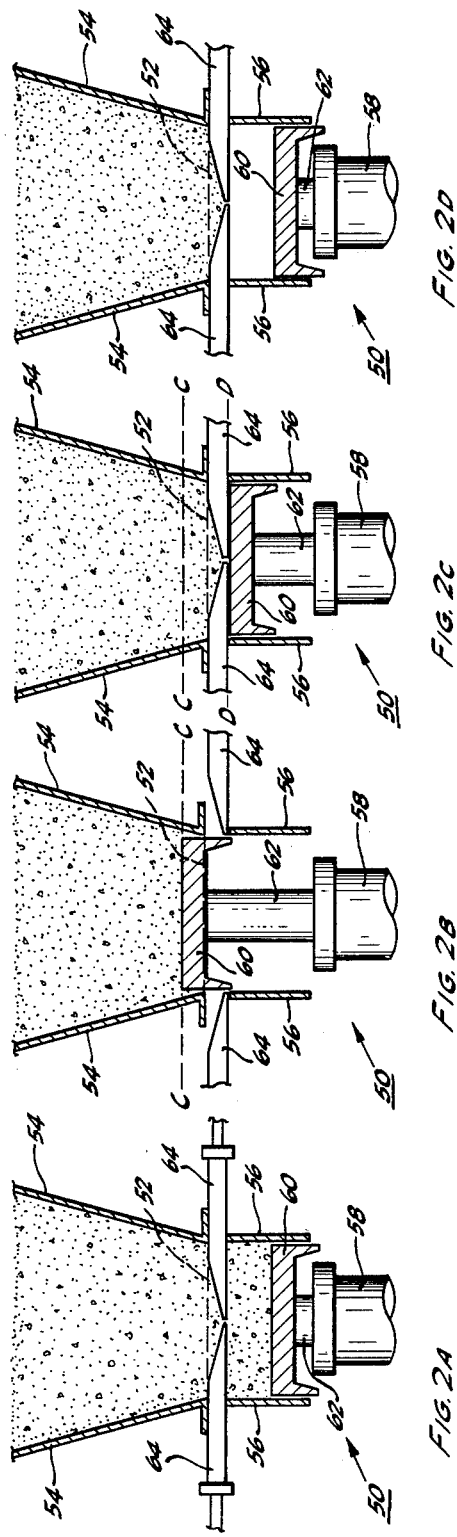

METHOD FOR INTRODUCING SOLIDS INTO A SOLIDS UPFLOW VESSEL

BACKGROUND OF THE INVENTION

1. Field of the Invention

This invention relates to solids handling, and more particularly to methods for introducing particulate solids into the bottom of a solids upflow vessel, such as a vertical solids upflow retort used for heat treating oil-producing or oil-containing solids to recover oil and/or gas therefrom.

2. Description of the Prior Art

The problem of transporting particulate solids from a solids feed supply, such as a bin or reservoir of the particulate solids, into the bottom of a solids upflow vessel has been encountered in diverse operations, exemplary of which are the feeding of oil-producing and/or gas-producing solids, such as oil shale, tar sand, bituminous coal, oil-saturated diatomaceous earth, and the like into the bottom of a vertical solids upflow retort for treating the solids to recover oil and/or gas therefrom, and the production of synthesis gas by the reaction of gas containing steam with carbonaceous solids such as coal, coke, and the like.

In these operations, difficulties are encountered in the design and operation of mechanical feed systems because of the nature of the particulate solids being transported, typical solids being abrasive and difficult to handle on the one hand and on the other being friable and tending to abrade, thereby forming large quantities of undesirable fine particles. Feeder devices used to introduce solids into the bottom of an upflow solids bed must move the solids against the weight of the solids bed. Also, it is often the case that the solids must be transported from a storage bin at atmospheric pressure into a solids upflow vessel which operates at a superatmospheric pressure. These factors, coupled with the often gigantic size of the equipment required to obtain the desired solids handling capacity, and the fact that in some applications the feeder device must operate at elevated temperatures and in contact with liquids and/or gases produced in the solids treating process, present difficult design problems involving large and complex mechanical forces and complicated mechanical loadings that must be adequately provided for in the feeder design.

A number of different methods for introducing particulate solids into the bottom of a solids upflow vessel have been proposed, including the methods disclosed in U.S. Pat. Nos. 2,501,153 to Berg, 2,640,014 to Berg, 2,871,170 to Bewley et al., 2,875,137 to Lieffers et al., 2,895,884 to Switzer, 4,033,467 to Bewley et al. and 4,037,736 to Pownall et al. In each of the methods disclosed therein a piston adapted for reciprocation within a feed cylinder is alternately extended to introduce particulate solids from the feed cylinder into the bottom of the solids upflow vessel and retracted to receive additional solids from a feed reservoir into the feed cylinder. The solids can be introduced into a stationary feed cylinder by horizontally reciprocatable scoops while slide plates prevent backflow of the charged solids (U.S. Pat. No. 2,871,170 to Bewley et al.) or the feed cylinder can be oscillated, reciprocated or rotated into alignment with a bottom solids outlet of the feed reservoir to receive additional solids therefrom while a seal plate mounted on the feeder mechanism prevents backflow of the charged solids.

One limitation of the prior art methods for feeding solids into a solids upflow vessel is that the very high feed piston-to-solids pressures generated during the feeder charging stroke results in relatively large power consumption by the feeder mechanism. In the prior art methods these high piston-to-solids pressures are present even after the feeder piston has been fully extended, and these high pressures are also exerted against the seal plate or slide plates used to prevent backflow of solids as the feed cylinder is being refilled. Moreover, these high pressures must be overcome in order to close the slide plates or to oscillate, reciprocate or rotate the feed cylinder into alignment with the feed reservoir during the feeder cycle. Another problem is that these high pressures require the use of relatively thick and therefore expensive seal plates or slide plates, the weight of which in turn necessarily increases the power consumption of the feeder mechanism during the feeder cycle. The use of thick slide plates may additionally result in process operating problems in a solids upflow vessel, such as an oil shale retort, due to the significant rise and fall of the solids bed as the slide plates are opened and closed, respectively. Moreover, the high piston-to-solids pressures of the prior art methods can result in the crushing of the particulate solids thereby generating a significant amount of fine particles which increase the fluid pressure drop across an oil shale retort and necessitate the use of more power to circulate the eduction gas through the retort. Thus, a need exists for an improved method for introducing particulate solids into the bottom of a solids upflow vessel.

Accordingly, a primary object of this invention is to provide an improved method for introducing solids upwardly into the bottom of a solids upflow vessel wherein the aforementioned problems are substantially reduced.

Another object of this invention is to provide a solids feeding method in which the maximum feed piston-to-solids pressure is reduced as compared to prior art methods.

Still another object of this invention is to provide a solids feeding method in which the power requirements are substantially reduced as compared to the prior art methods.

Yet another object of this invention is to provide a solids feeding method which allows the use of a lighter weight, less expensive apparatus to feed and support the bed of solids in the solids upflow vessel.

A further object of this invention is to provide an improved solids feeding method to which the prior art solids feeding apparatus can be readily and inexpensively adapted.

Still further objects, advantages and features of the invention will become apparent to those skilled in the art from the following description when taken in conjunction with the accompanying drawings.

SUMMARY OF THE INVENTION

Briefly, the invention provides an improved method for introducing particulate solids upwardly into a solids upflow vessel containing a bed of the particulate solids. In the method, a piston adapted for reciprocation within a feed cylinder is consecutively (1) extended to a first position so as to displace particulate solids from the feed cylinder into the solids upflow vessel, (2) partially retracted a preselected distance to a second position so as to relax the bed of particulate solids, and (3), after positioning of a backflow prevention device to prohibit solids backflow from the retort, further retracted to allow additional particulate solids to be introduced into the feed cylinder. By proper selection of the preselected distance for partial retraction of the piston, the piston-to-solids pressure can be reduced to bin loading pressures or less.

The method of this invention reduces the feed piston-to-solids pressures during the pumping stroke of the piston and substantially reduces the solids loading pressure on the backflow prevention device during refilling of the feed cylinder. The reduced pressures allow the use of less bulky, lighter weight feeder mechanisms and also reduce the power consumption of the feeder mechanism. The method allows the use of thinner backflow prevention devices and, in the case of slide plate backflow preventers, substantially reduces the force required to close the slide plates. Thinner slide plates also result in less disturbance of the solids bed as the slide plates are opened or closed.

BRIEF DESCRIPTION OF THE DRAWINGS

The invention will be more readily understood by reference to the drawings, wherein like numerals refer to like elements, and in which:

FIGS. 1A through 1D are partial elevational views in cross-section of a solids feeding apparatus illustrating several steps of one embodiment of the method of this invention; and FIGS. 2A through 2D are partial elevational views in cross-section of a solids feeding apparatus illustrating several steps of another embodiment of the method of this invention.

DETAILED DESCRIPTION OF THE INVENTION

The method of this invention is useful in a wide variety of solids handling systems for introducing particulate solids upwardly into the bottom of a solids upflow vessel, and is particularly useful for introducing particulate oil shale or other oil-producing or oil-bearing solids upwardly into a vertical solids upflow retort for heat treatment of the solids. A wide variety of known apparatus are suitable for use in the method of this invention, such as the solids feeding apparatus disclosed in U.S. Pat. Nos. 2,501,153; 2,640,014; 2,871,170; 2,875,137; 2,895,884; 4,033,467; and 4,037,736, with only minor modifications to the feeder mechanism to incorporate the novel bed relaxation step of this invention. Such modifications will be obvious to those skilled in the art from this description.

Two of the most important design considerations in the construction of solids feeding apparatus are the maximum piston-to-solids pressure during the displacement of solids from the feed cylinder into the solids upflow vessel by the piston, and the solids loading pressure on the device employed to prohibit backflow of solids from the solids upflow vessel during the refilling of the feed cylinder. In the prior art methods, the piston is extended during the pumping stroke until the top surface of the piston is flush with the top of the feed cylinder. The piston remains in this fully extended position until the feed cylinder has been moved into alignment with a bottom solids outlet of a feed reservoir or, in the case of the apparatus disclosed in U.S. Pat. No. 2,871,170, until the slide plates are extended to prevent backflow of solids from the solids upflow vessel. With these methods the piston-to-solids pressure and the solids loading pressure on the backflow prevention device are quite large, such as on the order of 200 p.s.i. or more, and substantially in excess of bin loading pressures.

It has been discovered that by partially retracting the piston from its fully extended position, the bed of particulate solids in the solids upflow vessel will "relax" to substantially reduce the piston-to-solids pressure after relaxation and therefore result in a relatively low solids loading pressure on the backflow prevention device. By proper selection of the distance by which the piston is retracted, this pressure can be reduced to about bin loading pressure or less. Surprisingly, the bed relaxation step also reduces the maximum piston-to-solids pressure during the pumping stroke, such as by 25 percent or more. Both of these reductions in pressure result in substantial benefits in terms of reduced size and weight of equipment required and reduced power consumption.

Referring to FIGS. 1A through 1D, an oscillating solids feeder apparatus, shown generally as 10, is adapted to transport particulate solids from bottom outlet 12 of solids feed reservoir 13 and introduce the solids upwardly through bottom solids inlet 14 of frusto conical solids upflow vessel 16. Solids feeder apparatus 10 is fully described in U.S. Pat. No. 2,895,884, the disclosure of which is herein incorporated by reference, and therefore need not be described in detail. Apparatus 10 includes feed cylinder 18 supported from a trunnion, not shown, so that it can be oscillated in a vertical plane alternately between alignment with solids outlet 12 and alignment with solids inlet 14. Primary hydraulic actuating cylinder 22 is disposed within feed cylinder 18 to reciprocate piston 24 along the axis of feed cylinder 18. Shaft 26 connects piston 24 to hydraulic cylinder 22. Extending tangentially outwardly from the top of feed cylinder 18 are arcuate seal plates 28 and 30 adapted to prevent solids flow through solids outlet 12 and solids inlet 14, respectively, when feed cylinder 18 is not aligned therewith. A secondary hydraulic cylinder, not shown, oscillates feed cylinder 18 by means of shaft 32 between alignment with solids outlet 12 and alignment with solids inlet 14.

In the embodiment of the method of this invention illustrated in FIGS. 1A through 1D, feed cylinder 18 is first filled with particulate solids and then aligned with solids inlet 14, as shown in FIG. 1A. Then, as shown in FIG. 1B, hydraulic cylinder 22 causes shaft 26 to extend piston 24 to a first position, indicated as position "A," located above solids inlet 14 and within the expanding section of solids upflow vessel 16, thereby displacing all of the solids from feed cylinder 18 upwardly into vessel 16. Thereafter, as shown in FIG. 1C, piston 24 is retracted by means of hydraulic cylinder 22 and shaft 26 to a second position, indicated as position "B," in which the top surface of piston 24 is substantially flush with the top of feed cylinder 18. This retraction of piston 24 from position A to position B serves to relax the bed of particulated solids in vessel 16 thereby reducing the piston-to-solids pressure to substantially bin loading pressure or less. Feed cylinder 18 is then oscillated by means of shaft 32 into alignment with solids outlet 12 and seal plate 30 is simultaneously positioned below solids inlet 14 to prevent backflow of solids from vessel 16, as shown in FIG. 1D. Thereafter, piston 24 is fully retracted to a third position in feed cylinder 18 and particulate solids are introduced by gravity flow from feed reservoir 13 through solids outlet 12 into the top of feed cylinder 18. Then to repeat the feeder cycle, feed cylinder 18 is oscillated into alignment with solids inlet 14, as shown in FIG. 1A.

Referring to FIGS. 2A through 2D, a solids feeder apparatus, shown generally as 50, is adapted to transport particulate solids from the bottom outlet of a solids feed reservoir, not shown, and introduce the solids upwardly through bottom solids inlet 52 of conical solids upflow vessel 54. Solids feeder apparatus 50 is fully described in U.S. Pat. No. 2,871,170, the disclosure of which is herein incorporated by reference, and therefore need not be described in detail. Apparatus 50 includes stationary feed cylinder 56 fixedly positioned below and in axial alignment with solids inlet 52. Hydraulic actuating cylinder 58 is disposed within feed cylinder 56 to vertically reciprocate piston 60 by means of shaft 62. Horizontally reciprocatable slide plates 64 are positioned between solids inlet 52 and feed cylinder 56, and are adapted to be alternately extended and retracted during the feeder cycle by means of hydraulic cylinders, not shown. The bottoms of slide plates 64 are substantially flush with the top of feed cylinder 56 and the tops of sllide plates 64 are substantially flush with bottom solids inlet 52 of vessel 54. The apparatus for filling feed cylinder 56 with solids is not shown in FIGS. 2A through 2D, but is fully disclosed in U.S. Pat. No. 2,871,170.

In the embodiment of the method of this invention illustrated in FIGS. 2A through 2D, feed cylinder 56 is filled with particulate solids, as shown in FIG. 2A. Then slide plates 64 are retracted and hydraulic cylinder 58 causes shaft 62 to extend piston 60 to a first position, shown as position "C," located above solids inlet 52 and within the expanding section of solids upflow vessel 54, thereby displacing all of the solids from feed cylinder 56 upwardly into vessel 54, as shown in FIG. 2B. Thereafter, piston 60 is retracted by means of hydraulic cylinder 58 and shaft 62 to a second position, indicated as position "D," in which the top surface of piston 60 is substantially flush with the top of feed cylinder 56, and slide plates 64 are extended to prohibit backflow of solids from vessel 54 through solids inlet 52, as shown in FIG. 2C. The retraction of piston 60 from piston C to position D serves to relax the bed of particulate solids in vessel 54 thereby reducing the piston-to-solids pressure to substantially bin loading pressure or less. The extension of slide plates 64 will recompact the bed of solids to some extent, however, the slide plate-to-solids pressure will still be substantially less than with the prior art methods. With some combinations of slide plate thickness and distance for retraction of piston 60 between positions C and D, the slide plate-to-solids pressure will be between about bin loading pressure and about one third the maximum piston-to-solids pressure during the pumping stroke. Then, as shown in FIG. 2D, piston 60 is fully retracted to a third position as slide plates 64 prohibit backflow of solids from vessel 54. Subsequently additional solids are introduced from the feed reservoir into feed cylinder 56 in order to repeat the feeder cycle.

In the method of this invention, the feed piston is reciprocated among three distinct piston positions. As used herein, the term "first position" defines the uppermost position of the top surface of the piston during the charging stroke of the feeder cycle; the term "second position" defines the position of the top surface of the piston after completion of the bed relaxation step of the feeder cycle; and the term "third position" defines the bottom-most position of the top surface of the piston during the refilling of the feed cylinder. During the bed relaxation step of the method, the piston is retracted from the first position to the second position in order to relax the bed of solids in the solids upflow vessel.

The precise location of the first and second positions within the apparatus are not critical provided that the distance therebetween is sufficient to achieve satisfactory relaxation of the solids bed. The first position can be above the solids inlet of the solids upflow vessel with the second position being below the solids inlet of the upflow vessel. Alternatively, the first position can be flush with or below the solids inlet of the solids upflow vessel with the second position being below the solids inlet. The second position typically will be substantially flush with or below the top of the feed cylinder. In one preferred embodiment, the first position is substantially flush with the solids inlet of the solids upflow vessel and the second position is flush with or below the top of the feed cylinder. In the particularly preferred embodiment illustrated in the drawings, the first position is above the solids inlet and within an expanding section of the solids upflow vessel and the second position is substantially flush with the top of the feed cylinder.

The distance by which the piston is retracted during the bed relaxation step of the method of this invention, i.e., the distance between the first and second positions, is a critical feature of this invention and is selected for a particular apparatus in view of, inter alia, the configuration of the solids upflow vessel, the diameter of the feed piston, the type and thickness of the backflow prevention device, and the compressibility and other characteristics of the solids to be introduced into the solids upflow vessel. Alternatively, the feeder apparatus size and design can be selected in view of the solids to be transported and the reduced pressures achievable with the use of the method of this invention so as to optimize the design of the apparatus.

The distance between the first and second positions is selected to reduce the piston-to-solids pressure after bed relaxation to a desired pressure substantially less than the maximum piston-to-solids pressure during the charging stroke of the feeder cycle. Preferably this distance is selected in order to reduce the piston-to-solids pressure after relaxation to about bin loading pressure. Occasionally, pressures less than bin loading pressure may be achieved when bridging of solids occurs in the solids upflow vessel upon relaxation. As used herein, the term "bin loading pressure" is defined as the steady-state solids loading pressure on the bottom support of a bed of solids which is free from externally applied pressures.

Typically, the distance between the first and second positions will be at least about 0.02 times the diameter of the piston. It has been observed that a certain minimum distance between the first and second positions is required to relax the solids bed to bin loading pressure and that further retraction of the piston does not further reduce this pressure. Preferably the distance between the first and second positions is between about 0.03 and about 0.2 times the diameter of the piston, and good results are obtained when the distance between the first and second positions is between about 0.05 and about 0.1 times the diameter of the piston.

The invention is further illustrated by the following examples which are illustrative of specific modes of practicing the invention and are not intended as limiting the scope of the appended claims.

EXAMPLES 1 and 2

An apparatus substantially as illustrated in FIG. 2A is employed to transport particulate oil shale having a nominal size range of ¼-inch to 1-inch from an elevated feed reservoir and to introduce the particulate oil shale upwardly through bottom solids inlet 52 of upright frustoconical solids upflow vessel 54. Solids inlet 52 has a diameter of about 16 inches; piston 60 has a diameter of about 15 inches; and slide plates 64 are about 0.5-inch thick. Vessel 54 has a 4¼-feet high lower conical section which expands from solids inlet 52 at an angle of about 24 degrees from vertical, and a 5-feet high upper conical section which expands from the top of the lower section at an angle of about 15 degrees from vertical.

In Example 1, the feeder apparatus introduces the particulate oil shale into the vessel 54 by repetition of the following steps: (1) introducing particulate oil shale into feed cylinder 56 while slide plates 64 prohibit backflow of solids from vessel 54; (2) retracting slide plates 64 to communicate solids inlet 52 with feed cylinder 56; (3) extending piston 60 to the position in which the top surface of piston 60 is flush with the top of feed cylinder 56 and immediately below the bottom surface of slide plates 64; (4) extending slide plates 64 so as to prohibit backflow of solids from vessel 54; and (5) retracting piston 60 in order to allow the introduction of additional particulate oil shale into feed cylinder 56. This feeder cycle does not have a bed relaxation step and therefore the method of Example 1 is not within the scope of this invention.

In Example 2, the feeder apparatus introduces the particulate oil shale into vessel 54 in accordance with one embodiment of the method of this invention by repetition of the following steps: (1) introducing particulate oil shale into feed cylinder 56 while slide plates 64 prohibit backflow of solids from vessel 54; (2) retracting slide plates 64 to communicate solids inlet 52 with feed cylinder 56; (3) extending piston 60 to a first position in which the top surface of piston 60 is about 1.2-inches above the top of feed cylinder 56 and the bottom of slide plates 64, i.e., about 0.7-inch above solids inlet 52; (4) retracting piston 60 to a second position in which the top of piston 60 is flush with the top of feed cylinder 56 and immediately below the bottom of slide plates 64, thereby relaxing the bed of solids in vessel 54; (5) extending slide plates 64 so as to prohibit backflow of solids from vessel 54; and (6) retracting piston 60 in order to allow the introduction of additional particulate oil shale into feed cylinder 56.

In Example 1, the maximum piston-to-solids pressure during the charging stroke of piston 60 is about 182 p.s.i.g. and the solids loading pressure on slide plates 64 during the filling of feed cylinder 56 is about 182 p.s.i.g.

In Example 2, the maximum piston-to-solids pressure during the charging stroke of the piston is about 135 p.s.i.g. During the bed relaxation step of the feeder cycle, the piston-to-solids pressure is reduced to about 1 p.s.i.g. And, although the extension of slide plates 64 recompacts the bed of solids by about 0.5-inch, the solids loading pressure on slide plates 64 during the filling of feed cylinder 56 is only about 24 p.s.i.g.

The results of Examples 1 and 2 clearly demonstrate that the bed relaxation step of the method of this invention results in a substantially lower solids loading pressure on slide plates 64 (about 24 p.s.i.g. in Example 2 as compared to about 182 p.s.i.g. in Example 1) and a substantially lower piston-to-solids pressure during the charging stroke of piston 60 (about 135 p.s.i.g. in Example 2 as compared to about 182 p.s.i.g. in Example 1). Moreover, the force required to close slide plates 64 during step 5 of the feeder cycle of Example 2 is substantially less than the force required to close slide plates 64 during step 4 of the feeder cycle of Example 1.

EXAMPLES 3 and 4

Employing the same apparatus and feeder cycle as Example 2, additional particulate oil shale is introduced into the bottom of vessel 54 which already contains a bed of ¼-inch to 1-inch particulate oil shale from Example 2. In Example 3, a representative quantity of a nominal ¼-inch to ½-inch fraction of particulate oil shale screened from the particulate oil shale of Examples 1 and 2 is introduced into vessel 54. During Example 3, it is observed that the change in feed size results in no detectable difference in the solids feeding operation as compared to Example 2, i.e., the bed relaxation step substantially reduces the solids loading pressure on slide plates 64 and the maximum piston-to-solids pressure during the charging stroke.

In Example 4, a representative quantity of a nominal minus ¼-inch fraction of particulate oil shale screened from the particulate oil shale of Examples 1 and 2 is introduced into vessel 54 underneath the ¼-inch to ½-inch fraction of Example 3. No detectable difference in the solids feeding operation as compared to Examples 2 and 3 is observed in Example 4.

The results of Examples 2 through 4 clearly demonstrate that the advantages of the method of this invention are realized over a wide variety of particle sizes and that the bed relaxation step results in improved performance even at the relatively high ratio of piston diameter to average particle size in Example 4.

EXAMPLE 5

In accordance with the method of this invention, particulate oil shale having a nominal size range of ⅛-inch to 2-inches and a Fischer assay of about 41 gallons per ton is transported from a solids feed reservoir and introduced upwardly into the bottom of a vertical frustoconical retort at a rate of about 10,000 tons per day by means of a piston having a diameter of about 10 feet and adapted for axial reciprocation within a feed cylinder. The feed cycle consists of the consecutive steps of (1) introducing particulate oil shale into the feed cylinder while a backflow prevention device prohibits backflow of solids from the retort; (2) communicating the feed cylinder with the bottom solids inlet of the retort and extending the piston upwardly to a first position in which the top surface of the piston is above the solids inlet and about 6 inches above the top of the feed cylinder, thereby displacing the oil shale from the feed cylinder into the retort; (3) retracting the piston to a second position in which the top surface of the piston is substantially flush with the top of the feed cylinder, thereby relaxing the bed of solids within the retort; (4) positioning the backflow prevention device immediately below the solids inlet so as to prohibit backflow of solids from the retort; and (5) retracting the piston to a third position within the feed cylinder so as to allow the introduction of additional particulate solids from the feed reservoir into the feed cylinder.

While particular embodiments of the invention have been described, it will be understood, of course, that the invention is not limited thereto since many obvious modifications can be made, and it is intended to include within this invention any such modification as will fall within the scope of the appended claims.

Having now described the invention, I claim:

1. A method for introducing particulate solids upwardly into a solids upflow vessel containing a bed of particulate solids and having a bottom solids inlet, comprising the steps of:
   (a) communicating with said solids inlet a feed cylinder at least partially filled with particulate solids and fitted with a piston axially reciprocatable within said feed cylinder;
   (b) extending said piston upwardly to a first position thereby displacing at least a portion of the solids from said feed cylinder through said solids inlet into said solids upflow vessel;
   (c) thereafter retracting said piston to a second position spaced a preselected distance below said first position thereby relaxing said bed of particulate solids, said preselected distance being selected such that the retraction of said piston in step (c) substantially reduces the pressure between said piston and said solids;
   (d) positioning a solids backflow prevention element directly below said solids inlet so as to prevent backflow of said solids downwardly through said solids inlet;
   (e) thereafter further retracting said piston to a third position spaced below said second position; and
   (f) transporting additional particulate solids from a solids feed reservoir and introducing said additional particulate solids into said feed cylinder.

2. The method defined in claim 1 wherein said steps (a) through (f) are repeated for a plurality of cycles.

3. The method defined in claim 1 further comprising, during step (d), moving said feeder cylinder into alignment with a bottom solids outlet of said feed reservoir; and wherein said additional particulate solids are introduced into said feed cylinder by gravity flow from said feed reservoir through said solids outlet.

4. The method defined in claim 1 wherein said preselected distance is selected such that the pressure between said piston and said solids is reduced in step (c) to about bin loading pressure or less.

5. The method defined in claim 1 wherein said preselected distance is between about 0.03 and about 0.2 times the diameter of said piston.

6. The method defined in claim 1 wherein said preselected distance is between about 0.05 and about 0.1 times the diameter of said piston.

7. The method defined in claim 1 wherein said first position is above said solids inlet and within said solids upflow vessel, and wherein said second position is below said solids inlet.

8. The method defined in claim 7 wherein said first position is within an outwardly expanding section of said solids upflow vessel.

9. The method defined in claim 7 wherein said second position is that position in which the top surface of said piston is substantially flush with the top of said feed cylinder.

10. The method defined in claim 1 wherein said first and second positions are below said solids inlet, and said second position is within said feed cylinder.

11. The method defined in claim 10 wherein said first position is that position in which the top surface of said piston is substantially flush with the top of said feed cylinder.

12. A method for introducing particulate solids upwardly into a solids upflow vessel containing a bed of particulate solids and having a bottom solids inlet, comprising the steps of:
   (a) communicating with said solids inlet a feed cylinder at least partially filled with particulate solids and fitted with a piston axially reciprocatable within said feed cylinder;
   (b) extending said piston upwardly to a first position in which the top of said piston is substantially flush with the top of said feed cylinder, thereby displacing said solids from said feed cylinder through said solids inlet into said solids upflow vessel;
   (c) thereafter retracting said piston to a second position in which the top of said piston is spaced a preselected distance below the top of said feed cylinder thereby relaxing said bed of particulate solids and reducing the pressure between said piston and said solids to about bin loading pressure or less, said preselected distance being between about 0.03 and about 0.2 times the diameter of said piston;
   (d) positioning a solids backflow prevention element directly below said solids inlet so as to prevent backflow of said solids downwardly through said solids inlet;
   (e) thereafter further retracting said piston to a third position spaced below said second position;
   (f) transporting additional particulate solids from a solids feed reservoir and introducing said additional particulate solids into said feed cylinder; and
   (g) repeating steps (a) through (f) for a plurality of cycles.

13. The method defined in claim 12 further comprising, during step (d), moving said feed cylinder into alignment with a bottom solids outlet of said feed reservoir; and wherein said additional particulate solids are introduced into said feed cylinder by gravity flow through said solids outlet as said piston is retracted to said third position.

14. The method defined in claim 12 wherein said preselected distance is between about 0.05 and about 0.1 times the diameter of said piston.

15. A method for introducing particulate solids upwardly into a solids upflow vessel containing a bed of particulate solids and having a bottom solids inlet, comprising the steps of:
   (a) communicating with said solids inlet a feed cylinder at least partially filled with particulate solids and fitted with a piston axially reciprocatable within said feed cylinder;
   (b) extending said piston upwardly to a first position in which the top of said piston is a preselected distance above the top of said feed cylinder thereby displacing said solids from said feed cylinder through said solids inlet into said solids upflow vessel, said preselected distance being between about 0.03 and about 0.2 times the diameter of said piston;
   (c) thereafter retracting said piston to a second position in which the top of said piston is substantially flush with the top of said feed cylinder thereby relaxing said bed of particulate solids and reducing the pressure between said piston and said solids to about bin loading pressure or less;
   (d) positioning a solids backflow prevention element directly below said solids inlet so as to prevent backflow of said solids downwardly through said solids inlet;

(e) thereafter further retracting said piston to a third position spaced below said second position;

(f) transporting additional particulate solids from a solids feed reservoir and introducing said additional particulate solids into said feed cylinder; and (g) repeating steps (a) through (f) for a plurality of cycles.

16. The method defined in claim 15 further comprising, during step (d), moving said feed cylinder into alignment with a bottom solids outlet of said feed reservoir; and wherein said additional particulate solids are introduced into said feed cylinder by gravity flow through said solids outlet as said piston is retracted to said third position.

17. The method defined in claim 16 wherein, in step (a), said feed cylinder is moved into alignment with said solids inlet such that the top of said feed cylinder is immediately below said soids inlet; wherein said backflow prevention element comprises one or more shoe elements adapted to be automatically positioned immediately below said solids inlet as said feed cylinder is moved into alignment with said solids outlet in step (d); and wherein said first position is within an outwardly expanding section of said solids upflow vessel.

18. The method defined in claim 15 wherein said preselected distance is between about 0.05 and about 0.1 times the diameter of said piston.

19. The method defined in claim 15 wherein said feed cylinder is fixedly positioned in alignment with said solids inlet, said backflow prevention element comprises one or more slide plates, and said solids feed reservoir has one or more bottom solids outlets adjacent to said feed cylinder; and wherein said method further comprises, after step (d), communicating said feed cylinder with said solids outlets and, in step (e), introducing said additional particulate solids through said solids outlet into said feed cylinder.

20. The method defined in claim 19 wherein said first position is above the top of said slide plates and within an outwardly expanding section of said solids upflow vessel.

* * * * *